March 17, 1931.　　　A. J. R. BARLATIER　　　1,796,432
FILM MOVING AND VIEWING APPARATUS
Filed Oct. 30, 1928
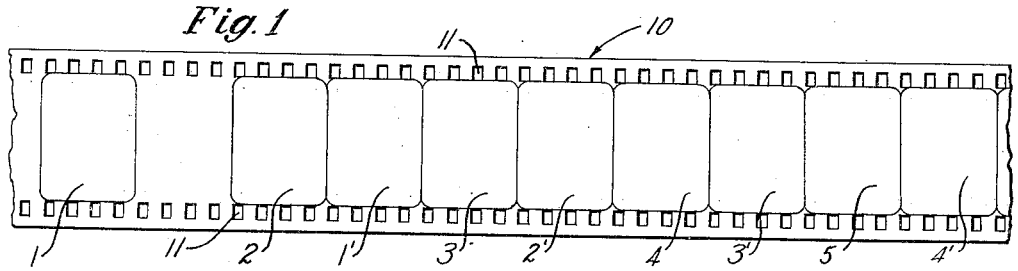
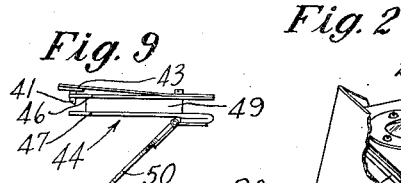
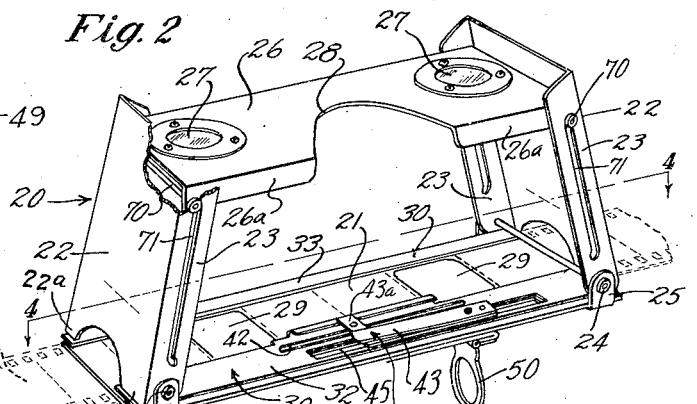
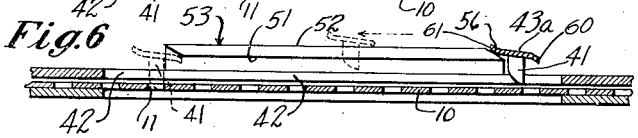
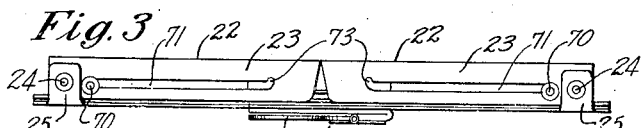
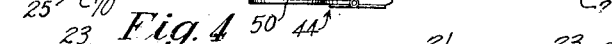
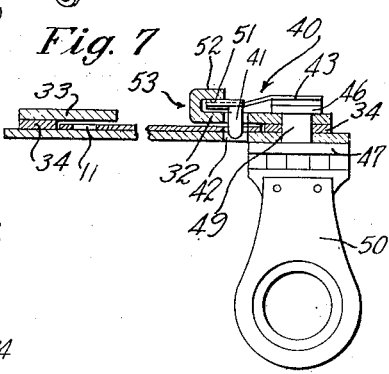
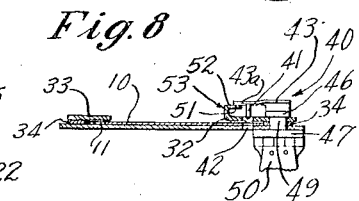
Inventor
André J. R. Barlatier.
Attorney.

Patented Mar. 17, 1931

1,796,432

UNITED STATES PATENT OFFICE

ANDRE J. R. BARLATIER, OF LOS ANGELES, CALIFORNIA

FILM MOVING AND VIEWING APPARATUS

Application filed October 30, 1928. Serial No. 315,949.

This invention relates generally to film moving and viewing devices, and while the invention is capable of a number of adaptations, it is particularly applicable to a stereoscopic device adapted to carry a strip of film having a series of stereoscopic views, and will therefore be described particularly in this connection, but without necessary limitation thereto. The strip of film utilized in the device may ordinarily be standard perforated motion picture stock, the stereoscopic pictures being arranged upon the film in successive pairs, which are so overlapped and spaced that successive views are brought before the eyes by a relatively short predetermined movement of the film, as will hereinafter be explained. Film having stereoscopic pictures arranged in the manner referred to is known to the art, the pictures ordinarily being taken in a known stereoscopic camera especially adapted to the purpose.

Film viewing devices, such as the stereoscopes of which I speak, are ordinarily provided with mechanism of some nature for moving the film to change views. A number of these mechanisms, however, have certain shortcomings and disabilities which it is an object of the present invention to overcome. For instance, insofar as I am aware, in the operation of the film moving mechanisms of all prior stereoscopic devices it may occur that a complete movement of the film is not made and the film moving claws leave the film in an intermediate position, in which case the device must be lowered from the eyes and the film be readjusted. In my improved mechanism the film moving claw is prevented from leaving the film except when the film is in proper position with its pictures in register with the apertures, thus positively precluding the possibility of the film coming out of adjustment after once being properly positioned.

Another object is to provide a device that is exceptionally simple and inexpensive and at the same time effective to the purpose.

Other objects and features of the invention will be made apparent from the following detailed description of a present preferred embodiment, reference for this purpose being had to the accompanying drawings, in which:

Fig. 1 shows a typical strip of film containing pairs of stereoscopically taken pictures;

Fig. 2 is a perspective of the stereoscope;

Fig. 3 shows the stereoscope collapsed;

Fig. 4 is a section taken on line 4—4 of Fig 2;

Fig. 5 is an enlarged fragmentary section taken on line 5—5 of Fig. 4, the film moving mechanism being in an extreme position;

Fig. 6 is an enlarged section similar to Fig. 5, but with the film moving mechanism in another position;

Fig. 7 is an enlarged, fragmentary, broken section taken on line 7—7 of Fig. 4, the film moving mechanism being shown in position to move the film;

Fig. 8 is a section similar to that of Fig. 7, but with the film moving mechanism in its return position and out of engagement with the film; and Fig. 9 is an elevation of the film moving carriage.

Referring now to the drawing, and particularly to Fig. 1, I show at 10 a typical strip of film, perforated at 11, and having successfully arranged pairs of stereoscopically taken pictures. For instance, frames 1, 1' comprise one such pair, the pictures of these frames being of the same objects but taken at stereoscopic angles. Frames 2, 2' comprise the next pair, frames 3, 3' the next, and so on. The two frames comprising each such pair are spaced on the film two frames apart, and each pair is spaced from the preceding pair by one frame, as may be seen from the figure. Thus one pair being in view in the device, the film must be moved a distance of two frames to shift to the next pair, as will be apparent. Films having stereoscopic pictures arranged in this or a similar manner are well known and form no part of the present invention, being merely set out here to aid in giving an understanding of the present invention.

In Fig. 2 I show the stereoscope 20 in perspective, the film 10 being indicated in position in dotted lines. The stereoscope comprises generally a base or aperture plate 21, side plates 22 having lateral flanges 23 and hinged at 24 to lugs 25 provided on the aperture plate, and a lens holding plate 26 carried by the flanges of the side plate. Lens holding plate 26 carries a pair of lenses 27 spaced properly for the eyes, and is cut as at 28 to provide an opening for the nose when the stereoscope is held in position before the eyes.

Aperture plate 21 is provided with a pair of apertures 29 corresponding in size and spacing to the pairs of frames on film 10. The longitudinal edges of the aperture plate are provided with film guides 30, which comprises guide strips 32 and 33, respectively, and spacers 34, arranged as shown best in section in Fig. 7. The film is advanced between these film guides and the aperture plate 21 by means of film moving mechanism, generally indicated at 40.

The film is moved by claw 41, which reaches the film perforations 11 through a claw slot 42 provided through guide strip 32 and aperture plate 21. The claw is carried by a laterally extending part 43a of a spring claw-carrier 43, which comprises a spring arm fastened at its end to a carriage or slider 44, and bent to a slight normal incline, as shown in Fig. 9. Carriage 44, which is mounted and adapted to be reciprocated in a carriage guide slot 45 provided through guide strip 32 and aperture plate 21, may comprise a plate 46 riding upon the upper face of film guide strip 32, and a second plate 47 riding upon the lower face of aperture plate 21, the two being connected by a spacing block 49 which works in the guide slot. The carriage is limited in movement by the ends of slot 45, and is manually reciprocated by means of a handle 50, which is preferably hinged to plate 47 in such a manner as to fold flat against it when not in use, as shown in Fig. 3.

The lateral extension 43a of claw carrier 43 rides on the lower and upper surfaces 51 and 52, respectively, of a claw-carrier guide plate 53 provided from the inner edge of film guide strip 32, as shown in Figs. 7 and 8 respectively.

The normal incline of carrier 43 is such that when carriage 44 is moved to its extreme left hand position, as viewed in Fig. 5, and the laterally extending claw-carrier part 43a has cleared the left end of guide 53 (as indicated in full lines in Fig. 5), the right hand edge 61 of the inclined carrier part 43a is opposite a downwardly inclined cam surface 55 provided on the corresponding end of guide 53, this cam surface being adapted to direct the inclined, laterally extending part 43a of claw-carrier 43 downward (see dotted line position of Fig. 6) to ride upon the lower surface 51 when the carriage is moved in the direction of the arrow. Claw 41 is accordingly lowered through slot 42 into engagement with the film perforations 11, and thus carries the film forward as the carriage is moved in the direction of the arrow. Attention is called to the fact that the claw-carrier part 43a is held below surface 51 of guide 53 during movement of the film, and that the claw 41 can therefore not come out of engagement with the film until part 43a has either passed out from under the right hand end of the claw-carrier guide, at which time the film has been advanced through a complete movement and its frames are in accurate registration with the apertures and lenses; or until the carriage has been pulled back to its starting position and part 43a has been allowed to rise at the left hand end of the guide strip, at which time the film is back in its original position with its frames again in accurate register with the apertures. The carriage guide slot is of such length as to restrict the movement of the carriage to limiting positions which will just allow the part 43a to clear the ends of the carrier guide, and in which the frames are in accurate register with the apertures. Thus claw 41, having engaged the film perforations, cannot be disengaged from the film until it has carried the film forward a distance of exactly two frames, at which time the film is in proper register for the next view; or, if a complete forward movement of the carriage is not made, until the film has been carried back to the starting position. And it cannot carry the film beyond these positions due to the limits imposed by the ends of the carriage guide slots.

The film having been carried through a complete movement, carrier part 43a clears the right hand end of carrier guide 53 and rises slightly due to the spring action of the carrier arm, thereby raising the claw practically out of engagement with the film. In this position, indicated by the dotted lines at the right hand end of the carrier guide in Fig. 5, the left hand edge 61 of the laterally extending claw-carrier part 43a is opposite an upwardly inclined cam surface 56 provided on the end of the carrier guide 52. As the carriage is then moved back, or to the left, the inclined, claw-carrier part 43a engages the upwardly inclined cam surface 56 which directs part 43a upwardly to its upper surface 52 (see full line position Fig. 6), and raises the claw 41 to its return position, well above and positively out of engagement with the film perforations. The claw-carrier part 43a thus rides on the guide surface 52, as in Fig. 8, and as in dotted lines in Fig. 6, back to its original position with its claw well clearing the film. The carrier part 43a thus forms, in effect, a camming piece adapted to be guided by the stationary guide plate 53.

It is preferable that the spring action of the carrier arm 43 raise the claw entirely out of the film perforations when the guide 52 is cleared; but this is not necessary, for the cam surface 56 will cause the claw to be raised further as the carriage is moved back, so that the film is positively cleared. For this purpose the claw may fit the perforations with sufficient looseness that the film is not moved back slightly before being cleared by the claw. As shown best in Figs. 5 and 6, the right hand edge 60 of the carrier part 43a is preferably bent slightly downward, and the left hand edge 61 slightly upward, to insure smooth and proper coaction with the cam surfaces.

The film is thus advanced to bring the succeeding pair of frames into view by movement of carriage handle 50 from its extreme left hand position to its extreme right hand position, after which the mechanism is returned to its original position, in readiness to bring the next pair of frames into view, by returning handle 50 to its extreme left hand position.

It may now be seen that by no possibility can the claw leave the film in an intermediate position and thus necessitate taking the device down from the eyes for readjustment; but on the other hand, when the film is once positioned in the device with the frames in proper register with the lens and apertures, the film is moved easily and quickly to bring succeeding pictures into view, the film moving mechanism operating positively to advance the film just the proper distance, and without possibility of the film coming out of adjustment with respect to the apertures.

The means of mounting the lens holding and side plates is such as to allow the device to collapse to the form shown in Fig. 3 when not in use. The lens holding plate 26 is provided with lateral flanges 26a, which carry headed cross pins 70 extending through slots 71 in the side plate flanges 23. Notches 73 are provided for the pins at the upper ends of slots 71 for the purpose of retaining the lens holding plate in its operative position. It will be seen that by pulling the upper ends of the side plates slightly apart, the pins may leave the notches 73 and may be moved down the slots, while the side plates fold in to take the position of Fig. 3. As the side plates are opened up to take the position of Fig. 2, the lower edges 22a contact with the upper surfaces of the film guide strips 32 and 33 just before the side plates reach their fully extended positions, and the side plates must then be sprung slightly outward to allow the lens holding plate to be brought up to its operative position, thus giving rigidity to the device.

From what has now been said it will be evident that I have provided an extremely simple and effective film moving mechanism, and that the mechanism is not at all limited in utility to a stereoscope, in connection with which the invention is particularized, but is applicable in a wide variety of connections in which a film is to be intermittently moved.

It will be understood the drawings and description are to be considered merely as illustrative of and not restrictive on the broader claims appended hereto, for various changes in design, structure and arrangement may be made without departing from the spirit and scope of said claims.

I claim:

1. In a device of the character described, the combination of a film race adapted to guide a perforated film, a guide paralleling said film race, a slider reciprocating in said guide, a resilient claw carrier mounted at one end on the slider and carrying a film engaging claw at its free end, a camming piece carried at the free end of the resilient carrier presenting two oppositely facing camming surfaces lying in planes diagonal to the movement of the slider and carrier and substantially parallel with each other, a stationary guide plate paralleling the film guide and lying in the path of the camming piece, the normal unstressed position of the carrier being such as to support the camming piece substantially in line with the guide plate so that upon movement in one direction one of the diagonal camming surfaces of the camming piece will strike one end of the guide plate and cause the camming piece to be deflected to one side of the guide plate, and upon movement in the opposite direction the other diagonal camming surface of the camming piece will strike the other end of the guide plate and cause the camming piece to be deflected to the other side of the guide plate.

2. In a device of the character described, the combination of a film race adapted to guide a perforated film, a guide paralleling said film race, a slider reciprocating in said guide, a resilient claw carrier mounted at one end on the slider and carrying a film engaging claw at its free end, a camming element carried at the free end of the resilient carrier, a stationary guide plate paralleling the film guide and lying in the path of the camming piece, the normal unstressed position of the carrier being such as to support the camming piece substantially in line with the guide plate, and the ends of the guide plate being formed to provide another camming element adapted to cooperate with the first mentioned camming element, one of said elements having oppositely facing diagonal faces, so that upon movement of the slider in one direction the camming element on the resilient carrier will strike one end of the guide plate and the cooperation of the camming elements will cause the camming element on the carrier to be deflected to one side of the guide plate, and upon movement in the opposite direction the camming element on the carrier will strike the other end of the guide plate and the cooperation of the camming elements will cause the carrier camming element to be deflected to the other side of the guide plate.

In witness that I claim the foregoing I have hereunto subscribed my name this 4th day of October, 1928.

ANDRÉ J. R. BARLATIER.